United States Patent
Ferrieux et al.

(10) Patent No.: US 6,466,907 B1
(45) Date of Patent: Oct. 15, 2002

(54) PROCESS FOR SEARCHING FOR A SPOKEN QUESTION BY MATCHING PHONETIC TRANSCRIPTION TO VOCAL REQUEST

(75) Inventors: Alexandre Ferrieux; Stephane Peillon, both of Perros-Guirec (FR)

(73) Assignee: France Telecom SA, Paris (FR)

(*) Notice: Subject to any disclaimer, the term of this patent is extended or adjusted under 35 U.S.C. 154(b) by 0 days.

(21) Appl. No.: 09/195,583

(22) Filed: Nov. 18, 1998

(30) Foreign Application Priority Data

Nov. 16, 1998 (FR) .......................................... 98 14381

(51) Int. Cl.[7] .............................................. G10L 15/08
(52) U.S. Cl. ...................... 704/254; 704/243; 704/236
(58) Field of Search ................................ 704/254, 243, 704/242, 241, 236, 260, 275, 270

(56) References Cited

U.S. PATENT DOCUMENTS

| | | | |
|---|---|---|---|
| 4,912,768 A | * | 3/1990 | Benbassat |
| 5,109,418 A | * | 4/1992 | Van Hemert ................ 704/213 |
| 5,329,608 A | * | 7/1994 | Bocchieri et al. ........... 704/243 |
| 5,500,920 A | * | 3/1996 | Kupiec ....................... 704/270 |
| 5,638,425 A | * | 6/1997 | Meador et al. .......... 379/88.01 |
| 5,703,308 A | * | 12/1997 | Tashiro et al ................ 84/609 |
| 5,724,481 A | * | 3/1998 | Garberg et al. ............. 704/243 |
| 5,737,725 A | * | 4/1998 | Case ........................... 704/260 |
| 5,867,597 A | * | 2/1999 | Peairs et al. ................ 382/209 |
| 5,890,123 A | * | 3/1999 | Brown et al. ............... 704/275 |
| 5,950,158 A | * | 9/1999 | Wang ........................... 704/244 |
| 6,041,323 A | * | 3/2000 | Kubota ........................... 707/5 |

FOREIGN PATENT DOCUMENTS

GB 2355836 A1 * 2/2002 ........... G10L/15/12

OTHER PUBLICATIONS

S. Kwong and C. W. Chou, "Genetic Algorithm for Optimizing the Nonlinear Time Alignment of Automatic Speech Recognition Systems," IEEE Trans. Industrial Electron., vol. 43, No. 5, Oct. 1996, pp. 559–566.*

* cited by examiner

*Primary Examiner*—Marsha D. Banks-Harold
*Assistant Examiner*—Donald L. Storm
(74) *Attorney, Agent, or Firm*—Michael Best & Friedrich LLC

(57) ABSTRACT

A process provides for searching through a written text in response to a spoken question comprising a plurality of words. The first step in the process is to transcribe the written text into a first sequence of phonetic units. Then, a spoken question is segmented into a second sequence of phonetic units. The search is conducted through the written text for an occurrence of the spoken question. The search comprises aligning the first and second sequences of phonetic units.

6 Claims, 1 Drawing Sheet

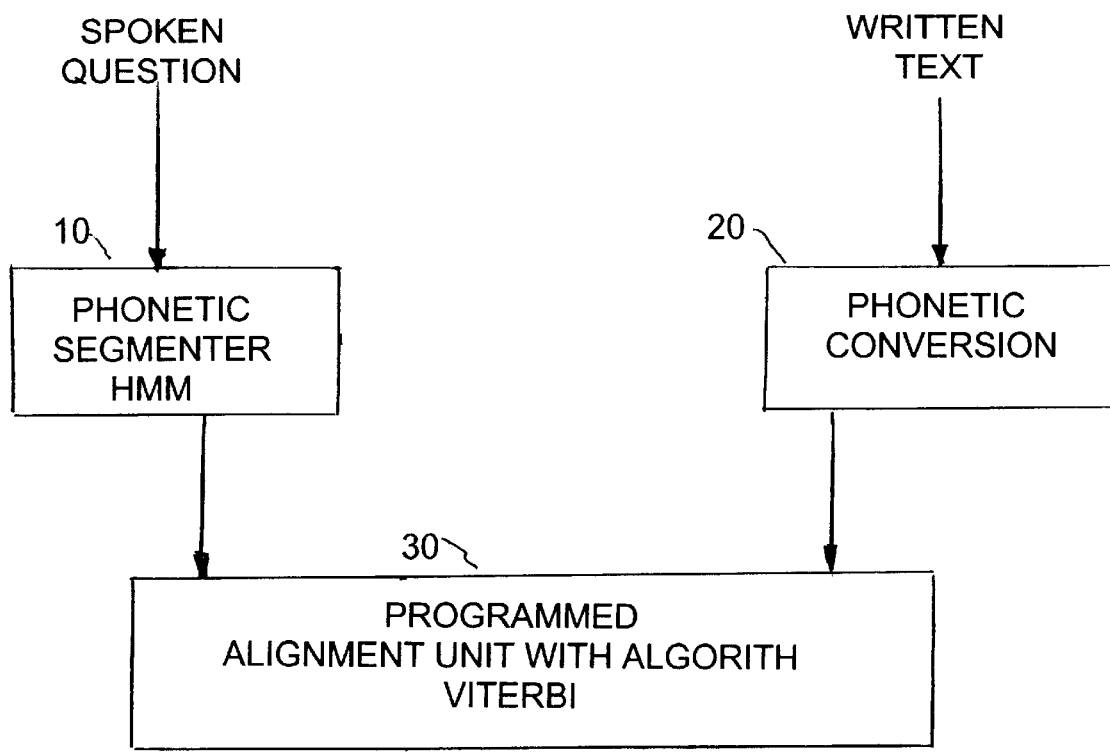

PROCESS FOR SEARCHING FOR A SPOKEN QUESTION BY MATCHING PHONETIC TRANSCRIPTION TO VOCAL REQUEST

BACKGROUND OF THE INVENTION

The usual methods of searching through textual content, have hitherto been extended to oral requests by the indirect method of predefined vocabularies. The speech request formulated by the user is transcribed by speech recognition in the form of words belonging to predefined vocabularies. These words can be used to retrieve the required text by means of a conventional textual indexing system which determines the place or places where the word occurs.

The advantage of this approach is simplicity, since transcription by speech recognition therein is simply a source of requests formulated as in writing.

The system is rather rigid, however, owing to the need for advance definition of a vocabulary, and hence one or more subjects, on to which all possible requests are "projected".

It has been found that the prior—art search methods are insufficiently flexible in contexts where there is a wide range of subjects, such as the contents available on the Internet or via e—mail.

SUMMARY OF THE INVENTION

The aim of the invention is to propose a method of searching through the contents of textual documents, using speech recognition but eliminating the constraint on the vocabulary.

To this end, a method according to the invention is characterized in that it consists in transcribing the text into a first set of phonetic units, segmenting the said spoken request into a second set of discrete phonetic units and searching for the places where the requested expression occurs in the text, by a process of aligning the said first and second sets of phonetic units. Advantageously the said alignment process is effected by means of a dynamic programming algorithm, the parameters being e.g. the cost of omission, insertion or substitution of various phonetic units.

Advantageously the values taken by the said parameters are determined by learning from a body of examples, the object being to optimize an objective function such as a probability function or a discrimination function.

According to another feature of the invention, the said objective function is the probability function, which is optimized by an analytical method comprising an EM (Expectation Maximization) algorithm having a loop in which Lagrange multipliers are used.

According to another feature of the invention, the said objective function is the discrimination function, which is optimized by means of a genetic algorithm, the evaluation function being the rate of correct identifications.

The features of the invention mentioned hereinbefore, together with others, will be clearer from the following description of an exemplified embodiment of the process according to the invention, the description being given in connection with the accompanying drawing illustrating the method.

BRIEF DESCRIPTION OF DRAWING

The single drawing illustrates a method of searching through the contents, according to the invention.

DETAILED DESCRIPTION OF THE INVENTION

A speech request REQ made by the user and in the form of an acoustic continuum is segmented into a set of discrete phonetic units by an acoustic—phonetic decoding unit 10. The text TEXT in which the search for occurrence is made is transcribed into a set of phonetic units of similar type, by an automatic phonetic transcription unit 20. An alignment unit 30 aligns the phonetic units resulting from the request REQ and the phonetic units resulting from the text TEXT.

The phonetic units in question here are e.g. phones, phonemes, diphones, syllables, elementary acoustic states (phenones), allophones, etc.

Since the search is made among phonetic representations of the spoken request and of the target text, the method is independent of the vocabulary used.

The acoustic-phonetic decoding unit 10 is e.g. of the kind using an HMM (Hidden Markov Model) algorithm.

The phonetic transcription unit 20 is e.g. of the kind used in systems of synthesising speech from a text, based on rules.

The alignment via the alignment unit 30 is made by means of a dynamic programming algorithm such as the Viterbi algorithm, in which the parameters can be the cost of omission, insertion or substitution of one or more phonetic units in the set resulting from the request REQ. The cost of substitution, for example, is defined by a confusion matrix which, at the intersection of a line and a column representing two respective phonetic units, gives the said cost of substituting one unit by the other.

The values taken by the various parameters of the dynamic programming algorithm are determined by previous learning from a body of examples in which the aim is to optimize an objective function such as a probability function or a discrimination function. The probability function is optimized e.g. by an analytical method comprising an EM (Expectation Maximization) algorithm having a loop in which Lagrange multipliers are used. The discrimination function can be optimized by an optimization algorithm such as a genetic algorithm, the generalised form of a simulated refinement algorithm, in which the only requirement is knowledge of the evaluation function. The evaluation function will then be the rate of correct identifications.

The learning process therefore can result in optimum coupling of the acousticphonetic decoding unit 10 with the automatic phonetic transcription unit 20, thus minimizing the effects of the respective errors thereof Suppose a spoken request is in the form of the French words "automne—hiver" (="autumn-winter")

The phonetic transcription made by unit 10 is e.g. as follows:

on t au m i f ai r oe

Suppose the text TEXT is: "Pour obtenir le catalogue automnme—hiver cliquez ici"=("to obtain the autumn-winter catalogue, click here")

Transcription thereof by unit 10 is e.g. as follows:

p u r o b t oe n i r l oe k a t a l o g au t o n i v ai r k l i k ei i s i

Detection by unit 30 will be as follows:

p u r o b t oe n i r l oe k a t a l o g au t o ni v ai r k l i k ei i s i oñ t aû mi̭ f âi r̂ oe* where the sign ^ means "substitution" and the sign * indicates an omission.

As can be seen, there is complete freedom of segmentation, in addition to free choice of target words. In the example hereinbefore, "catalogue automne" (="autumn catalogue") or "obtenir le catalogue" (="obtain the catalogue") can both be used as keys. If an attempt was made to obtain the same freedom by traditional techniques, the result would either be a combinatorial explosion (since all groups of two words, three words, . . . n words would need to be provided) or a very free syntax and a very large vocabulary, which are both sources of errors in recognition.

In addition the computing cost of the method according to the invention is very low as regards speech recognition, since only phonetic units are recognised, irrespective of the vocabulary actually used as a search key.

The cost of computing the alignment by unit 30 is also reasonable; in the case of a typical spoken request of three or four syllables, a micro-computer of the kind at present on sale can process about 100,000 phonemes per second, so that access via the contents can safely be had to a loaded e—mail address or to a very long page in HTML format.

Various applications are possible, e.g. voice selection of messages via the contents (text+headings) in an e—mail address or flexible voice monitoring of an Internet navigation client, where the targets are not restricted to links. The nearest link can then be activated simply by pronouncing an expression.

We claim:

1. A process for searching through a textual document in response to an oral command, said process comprising the steps of:

(a) transcribing a written text comprising a plurality of consecutive words into a first sequence of discrete phonetic units;

(b) segmenting a spoken request into a second sequence of discrete phonetic units without a reference to a predefined word; and (c) searching through said transcribed text of step (a) for an occurrence of the written text corresponding to the spoken request of step (b), said search being carried: out by maximizing an alignment of said first and second sequences of phonetic units.

2. The process of claim 1 wherein step (b) is carried out independently of a prestored vocabulary of words, and the alignment of step (c) is carried out in response to an algorithm which maximizes the alignment of said first and second sequences of phonetic units independently of a prestored vocabulary.

3. The process of claim 2 wherein said maximized alignment is carried out in a manner which is free of a need to disambiguate a match of step (c) on a basis of a predefined sequence of words.

4. The method of claim 2 and the further step responsive to said algorithm comprising finding omissions, insertions, and substitution of various phonetic units.

5. The method of claim 4 and the further steps taken responsive to said algorithm comprising:

(e) initializing said process by a learning step responsive to a person speaking a body of exemplary words;

(f) optimizing an objective function responsive to the results of steps (a)–(c) and responsive to a probability function and a discrimination function.

6. The method of claim 5 and the further steps of using Lagrange multipliers in a loop in said algorithm for optimizing an expectation maximization for preparing said objective function in response to an objective probability function.

* * * * *